United States Patent
Little

(10) Patent No.: US 7,609,486 B1
(45) Date of Patent: Oct. 27, 2009

(54) DISK DRIVE INCLUDING A POST ATTACHED TO A DISK DRIVE BASE AND A COVER FOR LIMITING ROTATION OF AN ACTUATOR

(75) Inventor: Aaron D. Little, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 606 days.

(21) Appl. No.: 11/113,897

(22) Filed: Apr. 25, 2005

(51) Int. Cl.
*G11B 21/08* (2006.01)
(52) U.S. Cl. .................................. 360/266.1
(58) Field of Classification Search .............. 360/265.1, 360/264.8, 264.9, 266.1
See application file for complete search history.

(56) References Cited

U.S. PATENT DOCUMENTS

| | | | | |
|---|---|---|---|---|
| 4,772,974 A | * | 9/1988 | Moon et al. | 360/78.04 |
| 5,214,549 A | * | 5/1993 | Baker et al. | 360/97.02 |
| 5,459,359 A | * | 10/1995 | Umehara | 310/13 |
| 5,483,400 A | * | 1/1996 | Tsujino | 360/264.8 |
| 5,864,447 A | * | 1/1999 | Matsumoto et al. | 360/265.1 |
| 5,973,888 A | * | 10/1999 | Chawanya et al. | 360/265.1 |
| 6,125,016 A | * | 9/2000 | Lin | 360/264.8 |
| 6,205,004 B1 | * | 3/2001 | Kim | 360/264.1 |
| 6,426,847 B1 | | 7/2002 | Dague et al. | |
| 2004/0240120 A1 | | 12/2004 | Suzuki et al. | |
| 2005/0111141 A1 | * | 5/2005 | Price | 360/265.1 |

FOREIGN PATENT DOCUMENTS

JP 10241305 A * 9/1998

* cited by examiner

*Primary Examiner*—Allen T Cao
(74) *Attorney, Agent, or Firm*—Barcelo & Harrison, LLP

(57) ABSTRACT

A disk drive includes a disk drive base. The disk drive further includes a cover. The disk drive further includes a rotary actuator rotably coupled to the disk drive base and the cover. The rotary actuator is disposed between the disk drive base and the cover. The disk drive further includes a post attached to the disk drive base. The post is positioned to limit a pivot arc of the rotary actuator in at least one direction of rotation. The post includes a post distal end extending away from the disk drive base and attached to the cover.

11 Claims, 3 Drawing Sheets

DISK DRIVE INCLUDING A POST ATTACHED TO A DISK DRIVE BASE AND A COVER FOR LIMITING ROTATION OF AN ACTUATOR

FIELD OF THE INVENTION

The present invention relates generally to disk drives, and in particular to a disk drive including a post attached to a disk drive base and a cover for limiting rotation of an actuator.

BACKGROUND

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit assembly. A conventional "rotary" or "swing-type" actuator assembly typically includes a rotary actuator having an actuator body. The actuator body has a bore and a pivot bearing cartridge engaged within the bore to facilitate rotational movement of the actuator assembly between limited positions about an axis of rotation. In this regard, the pivot bearing cartridge includes a pivot shaft that is attached to both the disk drive base and the cover. A coil support extends from one side of the actuator body. An actuator coil is supported by the coil support and is configured to interact with one or more permanent magnetic elements, typically a pair, to form a voice coil motor. One or more actuator arms extend from an opposite side of the actuator body. Each head gimbal assembly includes a head that typically includes a transducer for writing and reading data and that is distally attached to each of the actuator arms. Each transducer typically includes a writer and a read element. The transducer's writer can be of a longitudinal or perpendicular design, and the read element of the transducer may be inductive or magnetoresistive. Each magnetic disk includes opposing disk surfaces. Data may be recorded along data annular regions on a single disk surface or both. As such, the head stack assembly may be pivoted such that each head is disposed adjacent to the various data annular regions from adjacent to the outer diameter to the inner diameter of each disk.

As mentioned above the head stack assembly includes the pivot bearing cartridge with the pivot shaft. The pivot shaft is attached to both the disk drive base and the cover. A lower end of the pivot shaft may be press-fit or threadedly engaged with the disk drive base. An opposing upper end may be threaded to receive a screw through the cover.

Due to cost, weight and/or sizing considerations, it is desirable to form the cover to be as thin as possible. However, as the relative thickness of the cover is reduced, the cover may tend to flex or warp (statically and dynamically) locally about the attachment location to the pivot shaft. This is problematic as the pivot shaft is coupled to the actuator and ultimately the heads. The flexure or warping of the cover may result a misalignment of the pivot shaft that results in a degradation of the disk drive performance. As such, maintenance of the relative lateral stiffness of the pivot shaft is of concern. Accordingly, there is a need in the art for an improved disk drive configuration in comparison to the prior art.

SUMMARY

A disk drive includes a rotary actuator rotably coupled to a disk drive base and a cover. The rotary actuator is disposed between the disk drive base and the cover. The disk drive further includes a post attached to the disk drive base. The post is positioned to limit a pivot arc of the rotary actuator in at least one direction of rotation. The post includes a post distal end extending away from the disk drive base and attached to the cover.

According to various embodiments, the post distal end may include a post threaded portion, and the disk drive may further include a post screw engaged with the post threaded portion through the cover for attaching the post distal end to the cover. The post may include a post base end disposed opposite the post distal end, and the post base end may be press-fit engaged with the disk drive base. The post may be formed of a metal material, such as stainless steel. The disk drive may further include a post pad attached to the post between the rotary actuator and the post. The post pad may have a hardness less than a hardness of the post. In this regard, the post pad may be formed of rubber. The post pad is disposed about the post. The rotary actuator may include a pivot bearing cartridge with a pivot shaft. The pivot shaft may include a shaft distal end extending away from the disk drive base and attached to the cover. The shaft distal end may include a shaft threaded portion, and the disk drive may further include a shaft screw engaged to the shaft threaded portion through the cover for attaching the shaft distal end to the cover. The rotary actuator may include a coil support, and the post may be positioned to contact the coil support upon rotation of the rotary actuator in at least one direction to limit the pivot arc of the rotary actuator in at least one direction of rotation.

DESCRIPTION OF THE PREFERRED EMBODIMENTS

Figure 1:
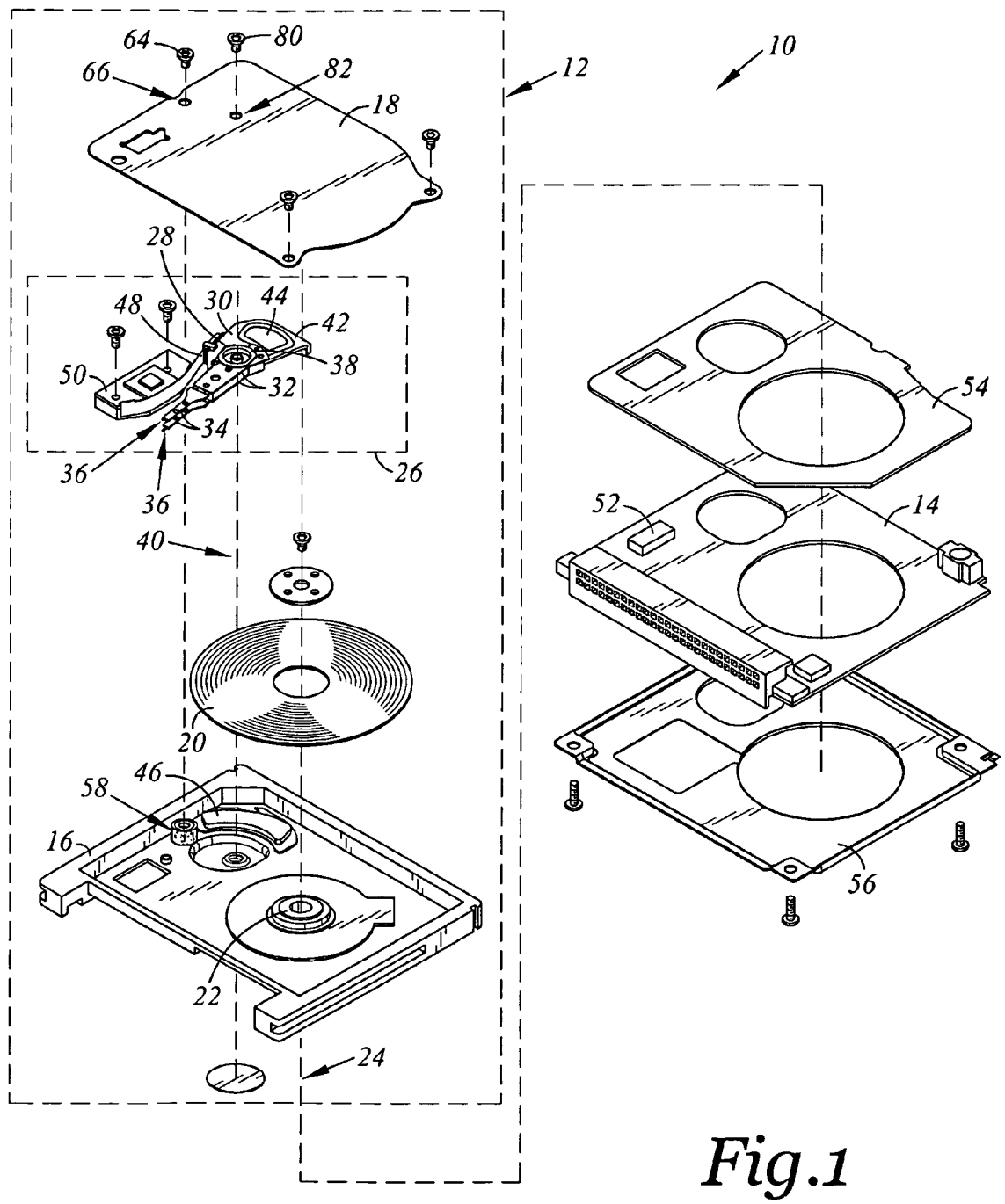
FIG. 1 is an exploded top perspective view of a disk drive in accordance with an embodiment of the present invention.

Referring now to FIG. 1, there is depicted an exploded perspective view of a disk drive 10 as constructed in accordance with an embodiment of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a disk 20. The disk 20 contains a plurality of tracks for storing data. The head disk assembly 12 further includes a spindle motor 22 for rotating the disk 20 about a disk rotation axis 24. The head disk assembly 12 further includes a head stack assembly 26 rotably attached to the disk drive base 16 in operable communication with the disk 20. The head stack assembly 26 includes a rotary actuator 28.

The rotary actuator 28 includes an actuator body 30 and actuator arms 32 that extend from the actuator body 30. Distally attached to the actuator arms 32 are suspension assemblies 34. The suspension assemblies 34 respectively support heads 36. Each of the heads 36 includes a head. The suspension assemblies 34 with the heads 36 are referred to as head gimbal assemblies. It is contemplated that the number of actuator arms and suspension assemblies may vary depending upon the number of disks and disk surfaces utilized.

In the embodiment shown, the actuator body 30 includes a bore, and the rotary actuator 28 further includes a pivot bearing cartridge 38 engaged within the bore for facilitating the actuator body 30 to rotate between limited positions about an axis of rotation 40. The rotary actuator 28 further includes a coil support 42 that extends from one side of the actuator body 30 opposite the actuator arms 32. The coil support 42 is configured to support an actuator coil 44.

A magnetic element 46 is attached to the disk drive base 16. The coil 44 interacts with the magnetic element 46 to form a voice coil motor for controllably rotating the actuator 28. The head stack assembly 26 further includes a flex circuit assembly 48 and a cable connector 50. The cable connector 50 is attached to the disk drive base 16 and is disposed in electrical communication with the printed circuit board assembly 14 through a socket 52. The flex circuit assembly 48 supplies current to the actuator coil 42 and carries signals between the heads of the heads 36 and the printed circuit board assembly 14.

A base insulator 54 may be provided between the printed circuit board assembly 14 and the disk drive base 16 for selectively electrically insulating various electrical components of the printed circuit board assembly 14. A PCBA shield 56 may be provided for protecting the printed circuit board assembly 14.

Figure 2:
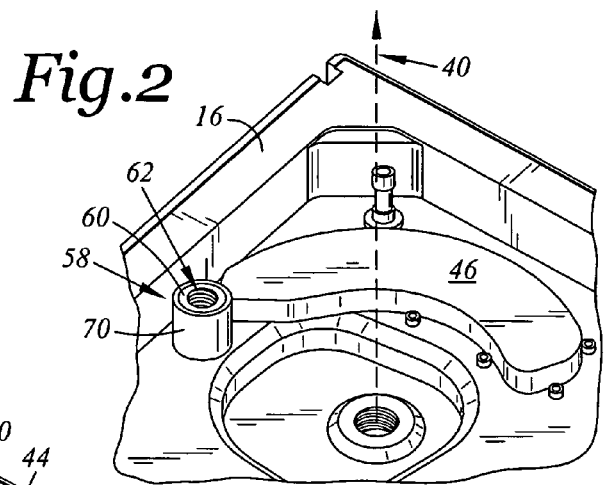
FIG. 2 is a perspective view of a portion of a disk drive base including a post of the disk drive of FIG. 1.
Figure 3:
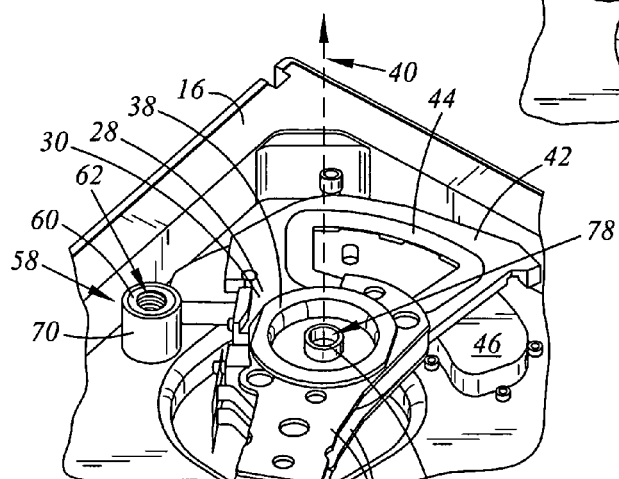
FIG. 3 is the portion of the disk drive base of FIG. 2 as shown with a rotary actuator.
Figure 4:
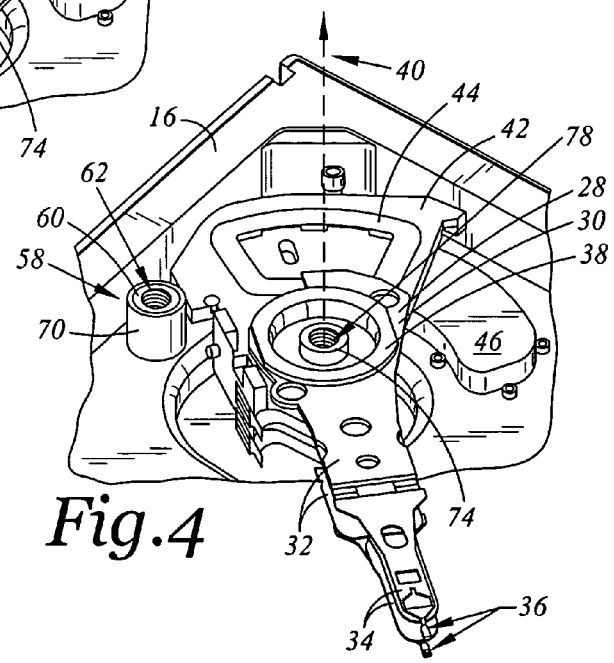
FIG. 4 is the portion of the disk drive base and the rotary actuator of FIG. 3 as shown with the rotary actuator pivoted in a counter-clockwise direction with a coil support contacting the post.
Figure 5:
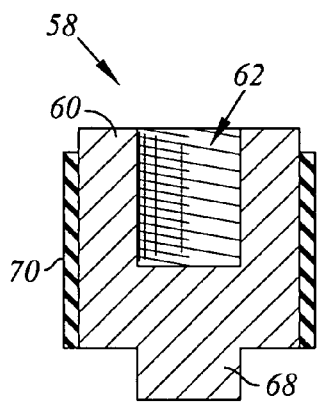
FIG. 5 is a cross-sectional view of the post.
Figure 6:
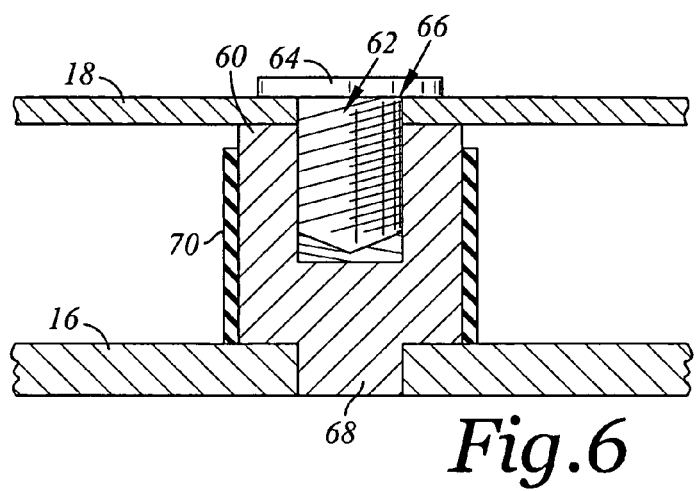
FIG. 6 is a cross-sectional view of the post as assembled with the disk drive base and cover with the use of a screw.
Figure 7:
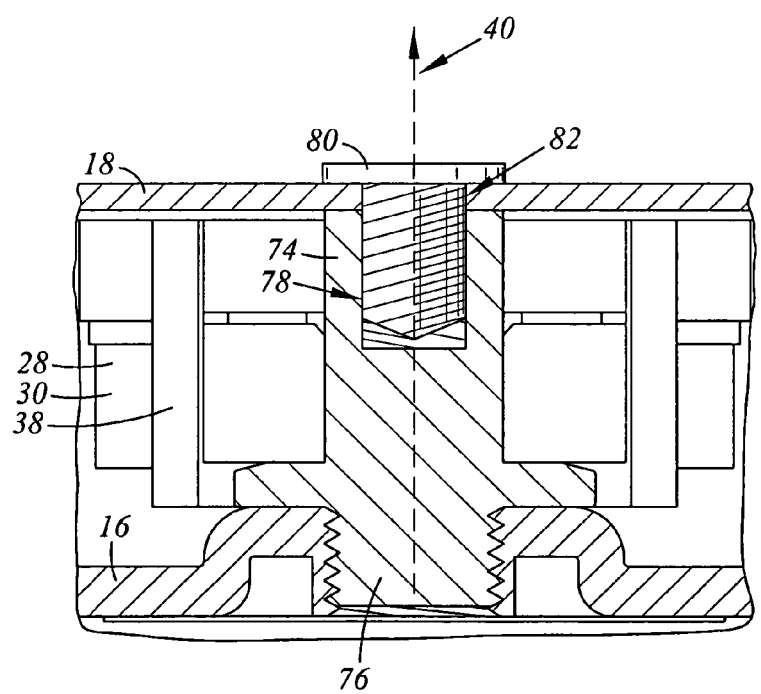
FIG. 7 is a cross-sectional view of the rotary actuator as assembled with the disk drive base and the cover.

Referring additionally to FIG. 2, there is depicted a perspective view of a portion of the disk drive base 16 of FIG. 1. As will be discussed in detail below, the disk drive 10 further includes a post 58 that extends from the disk drive base 16. FIG. 3 is the portion of the disk drive base 16 of FIG. 2 as shown with the rotary actuator 28. FIG. 4 is the portion of the disk drive base 16 and the rotary actuator 28 of FIG. 3 as shown with the rotary actuator 28 pivoted in a counter-clockwise direction with the coil support 42 contacting the post 58. FIG. 5 is a cross-sectional view of the post 58, and FIG. 6 is a cross-sectional view of the post 58 as assembled with the disk drive base 16 and the cover 18. FIG. 7 is a cross-sectional view of the rotary actuator 28 as assembled with the disk drive base 16 and the cover 18.

In the embodiment shown, the disk drive 10 includes the disk drive base 16. The disk drive 10 further includes the cover 18. The disk drive 10 further includes the rotary actuator 28 rotably coupled to the disk drive base 16 and the cover 18. The rotary actuator 28 is disposed between the disk drive base 16 and the cover 18. The disk drive 10 further includes the post 58 attached to the disk drive base 16. The post 58 can be positioned to limit a pivot arc of the rotary actuator 28 in at least one direction of rotation. The post 58 can include a post distal end 60 extending away from the disk drive base 16 and attached to the cover 18.

As mentioned above the post 58 can be positioned to limit the pivot arc of the rotary actuator 28. In the configuration shown in FIGS. 1, 3 and 4, the post 58 functions to limited to pivot arc of the rotary actuator 28 in a counter-clockwise direction associated with the heads 36 rotated adjacent an inner diameter (ID) of the disk 20. In this embodiment, the particular placement of the post 58 adjacent the rotary actuator 28 may serve the dual function of limiting the pivot arc and providing shear stiffness to the rotary actuator 28. In this regard, the post 58 is attached to the disk drive base 16 and the cover 18. Such attachment at the cover 18 may locally add support to the cover 18.

In certain embodiments, the post distal end 60 includes a post threaded portion 62. The disk drive 10 may further include a post screw 64 engaged with the post threaded portion 62 through the cover 18 for attaching the post distal end 60 to the cover 18. In this regard, the cover 18 may include a post screw hole 66, and the post screw may be disposed through the post screw hole 66. The post 60 may further include a post base end 68 disposed opposite the post distal end 60. The post base end 68 may be engaged with the disk drive base 16 for attaching the post 58 to the disk drive base 16. In this regard, the post base end 68 may be press-fit engaged with the disk drive base 16. The post 58 may be formed of various materials that are well known to one of ordinary skill in the art such as a metal material, such as stainless steel.

The disk drive 10 may further include a post pad 70 attached to the post 58 between the rotary actuator 28 and the post 58. The post pad 70 may have a hardness less than a hardness of the post 58. The post pad 70 may be formed of any number of materials that are chosen from those which are well known to one of ordinary skill in the art. In this regard, the post pad 58 may be formed of rubber. Other suitable materials may include plastic and silicon based materials. The post pad 70 may be formed through various methods known to one of ordinary skill in the art, such as the post pad 70 may be over-molded, compression molded, and/or injection molded, for examples. In this regard, the post pad 70 may be formed of a thermoplastic elastomer (TPE) material. In the embodiment shown, the post pad 70 is disposed about the post 58. As such, the post pad 70 has a cylindrical shape. The post pad 70 may have other shapes. For example, the post pad 70 may simply be a singular piece of material attached at one side of the post 58 disposed towards the rotary actuator 28.

As mentioned above, the rotary actuator 28 includes a coil support 42. In the embodiment shown, the post 58 is positioned to contact the coil support 42 upon rotation of the rotary actuator 28 in at least one direction (counter-clockwise as seen in FIGS. 1, 3 and 4) to limit the pivot arc of the rotary actuator 28 in at least one direction of rotation. Where the post 58 includes the post pad 70, the post 58 is positioned to contact the coil support 42 through an initial direct contact between the post pad 70 and the coil support 42.

As mentioned above, the rotary actuator 28 further includes the pivot bearing cartridge 38 for facilitating rotation of the actuator body 30. In this regard, the pivot bearing cartridge 38 may include a pivot shaft 72. The pivot shaft 72 may include a shaft distal end 74 and an opposing shaft base end 76. The shaft base end 76 is engaged with the disk drive base 16. The shaft distal end 74 extends away from the disk drive base 16 and is attached to the cover 18. In this regard, the shaft distal end 74 may include a shaft threaded portion 78. The disk drive 10 may include a shaft screw 80 engaged to the shaft threaded portion 78 through the cover 18 for attaching the shaft distal end 74 to the cover 18. The cover 18 may include a shaft screw hole 82 and is formed to receive the shaft screw 80. The shaft screw 80 and the post screw 64 may be of the same screw type to avoid separate part designations for those two components.

I claim:

1. A disk drive comprising:
   a disk drive base;
   a disk rotably coupled to the disk drive base;
   a cover attached to the disk drive base and overlying the disk, the cover and the disk drive base housing the disk;
   a rotary actuator rotably coupled to the disk drive base and the cover, the rotary actuator being disposed between the disk drive base and the cover; and
   a post attached to the disk drive base, the post being positioned to limit a pivot arc of the rotary actuator in at least one direction of rotation, the post including a post distal end extending away from the disk drive base and attached to the cover.

2. The disk drive of claim 1 wherein the post distal end includes a post threaded portion, the disk drive further includes a post screw engaged with the post threaded portion through the cover for attaching the post distal end to the cover.

3. The disk drive of claim 1 wherein the post includes a post base end disposed opposite the post distal end, the post base end is press-fit engaged with the disk drive base.

4. The disk drive of claim 1 wherein the post is formed of a metal material.

5. The disk drive of claim 4 wherein the post is formed of stainless steel.

6. The disk drive of claim 1 further includes a post pad attached to the post between the rotary actuator and the post, the post pad has a hardness less than a hardness of the post.

7. The disk drive of claim 6 wherein the post pad is formed of rubber.

8. The disk drive of claim 6 wherein the post pad is disposed about the post.

9. The disk drive of claim 1 wherein the rotary actuator includes a pivot bearing cartridge with a pivot shaft, the pivot shaft includes a shaft distal end extending away from the disk drive base and attached to the cover.

10. The disk drive of claim 9 wherein the shaft distal end includes a shaft threaded portion, the disk drive further includes a shaft screw engaged to the shaft threaded portion through the cover for attaching the shaft distal end to the cover.

11. The disk drive of claim 1 wherein the rotary actuator includes a coil support, the post is positioned to contact the coil support upon rotation of the rotary actuator in at least one direction to limit the pivot arc of the rotary actuator in at least one direction of rotation.

* * * * *